June 22, 1948. V. TUSA 2,443,753
FISH LURE
Filed May 22, 1946

INVENTOR
VICTOR TUSA
BY Liverance and
Van Antwerp
ATTORNEYS

Patented June 22, 1948

2,443,753

UNITED STATES PATENT OFFICE 2,443,753

FISH LURE

Victor Tusa, Amasa, Mich., assignor to Owen D. Premo, Muskegon Heights, Mich.

Application May 22, 1946, Serial No. 671,513

4 Claims. (Cl. 43—35)

The present invention relates to a novel, practical and effective fish hook or lure which, in its normal position, has the pointed ends of barbs of the hooks substantially covered so that they will not snag upon weeds or other obstructions, and which, when struck by a fish, will move relatively to each other to uncover and present the barbs of the hooks in a separated relation with respect to each other and in an accurate position to hook the fish at both the upper and lower sides of its mouth. The construction which I have provided for attainment of the results stated, is certain and sure in operation, is economically produced and of a sturdy and durable character.

An understanding of the invention may be had from the following description taken in connection with the accompanying drawings, in which.

Like reference characters refer to like parts in the different figures of the drawings.

Figure 1:
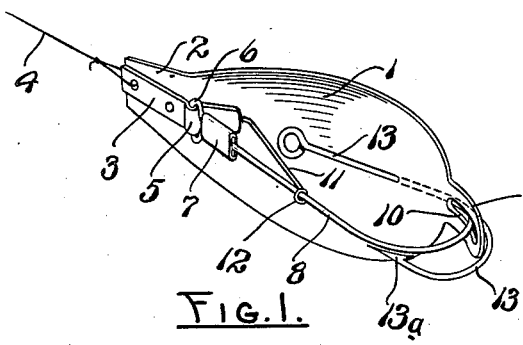
Fig. 1 is a perspective view of a fish hook or lure made in accordance with my invention.

In the construction, a spoon of thin metal having a body 1 of a concavo-convex form, its forward end being narrowed and bent slightly upward at an incline, providing a forward flat end section 2. To the under side thereof a narrow metal strip 3 is permanently connected and openings in conjunction are made near the forward ends of said section 2 and the metal strip 3 for connection with a line 4 as shown in Fig. 1.

The narrow elongated strip 3 of metal between its ends is shaped between its ends to provide a downwardly extending head 5 with which a wire loop 6 may be connected for pivotal movement. The wire loop 6 is connected by an interposed metal member 7 to the forward end of the shank of a fish hook 8 which, at its rear portion, is curved upwardly and thence in a forward direction. At the rear end of the spoon, a tail piece 9 is integrally formed, curving downwardly and to the rear in which a somewhat elongated slot 10 is cut. The barbed or point end 8a of the hook 8 extends through the slot 10.

A light rod 11 of spring material is fastened securely at its forward end portion between the rear end of the metal strip 3 and the under side of the body 1 of the spoon. It extends to the rear and downwardly and terminates at its free end in a loop 12 through which the shank of the hook 8 freely passes. Said spring is normally under a tension sufficient that it holds the hook in the position shown in Figs. 3 and 5, that is, with the barbed end 8a of the hook located at its under side against the upper side of the spoon immediately in front of the slot 10 and with the barb of the hook partially entering said slot. The hook is thus guarded against snagging upon weeds or other obstructions when drawn through the water as in casting, trolling or the like.

Figure 3:
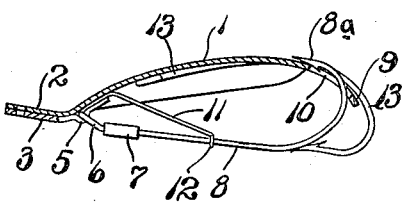
Fig. 3 is a longitudinal vertical section on the plane of line 3—3 of Fig. 2.
Figure 2:
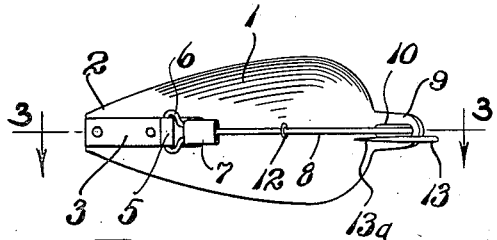
Fig. 2 is an under plan view thereof.

The fish hook structure is completed by a second hook 13, the shank of which passes through the rear portion of the spoon in front of the slot 11. The forward end portion of the shank and its eye are permanently secured by solder, brazing or equivalent means of fastening. Said hook 13 at the upper side of the body 1 is also preferably soldered or otherwise secured back of where it passes therethrough. The hook is bent downwardly and thence again in a forward direction terminating at its barbed end 13a located so that in normal position of the structure, such end is substantially in contact with the hook 8 where its rear curved portion joins with the straight shank portion of the hook, as shown in Figs. 3 and 5.

Figure 4:
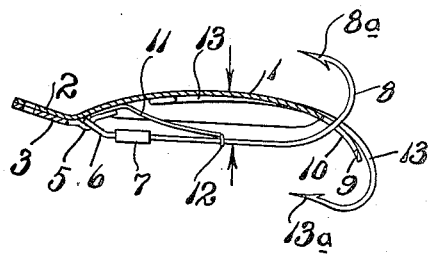
Fig. 4 is a similar section with hooks in the position taken upon being struck by a fish, and, Fig. 5 is a side elevation of the hook with a novel means of applying bait thereto shown.

When a fish strikes the fish hook structure described, and closes its jaws thereagainst, the spring 11 is overcome and the hook 8 moved to an upper position relative to the body of the spoon, and the hook 13 which is in a fixed relation to said spoon, thereby moving the barbed ends 8a and 13a, the one a distance above the body 1 of the spoon, and the other remaining a distance below said spoon, as in Fig. 4, with the result that the fish is securely hooked. The spring 11 of a very small diameter wire is, as previously stated, of a light strength, such that the relative movement of the hooks with respect to each other from the position in Fig. 3 to that in Fig. 4, is readily attained.

Figure 5:
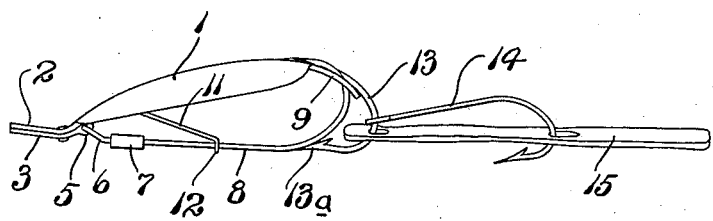

As shown in Fig. 5, an additional free hook 14 may be connected with the hook 13 by passing the eye of the hook 14 over the barbed end of hook 13 so that it will extend to the rear therefrom. Likewise, an elongated bait 15 which may be, for example, a length of pork-rind, may have an opening adjacent its front end for its connection with the hook 13 prior to placing the hook 14 thereon and, back of the first opening, a second opening through which a rear portion of the hook 14 passes. In the movement through the water and with the bait of proper dimensions, usually about 3/8" wide, 1/16" thick and 4" long, it is drawn lengthwise through the water, with an appreciable variation of movement induced by the wobbling of the spoon in the water without rotation, which the flattened portion of the spoon at its forward end, insures. This angularly disposed flat portion, indicated at 2, serves to give the spoon direction and a wobbling action in movement, and also maintains against rotation which is detrimental and undesirable, as rotation twists the line.

From the foregoing, it will be evident that a very practical and useful weedless fish lure has been provided, very readily manufactured and particularly practical and effective in use.

The invention is defined in the appended claims and is to be considered comprehensive of all forms of structure coming within their scope.

I claim:

1. In a structure as described, a concavo-convex spoon body of thin metal, having at its forward end a flat extension inclined slightly upward to the horizontal, said spoon body having at its rear end a downwardly curved tail-piece with a longitudinal slot therein, a hook pivotally connected at the under side of and near the juncture of said body and forward section and extending rearwardly and curved upwardly at its rear portion, said hook passing through said slot, spring means between the body and said hook normally holding the hook with its free, rear end, barbed portion bearing against the upper end of the body at the forward end of said slot, and a second hook having the shank thereof passing through and secured to said body ahead of said slot and having its rear end curved downwardly over said tail-piece and extending forwardly with its free barbed end in close proximity to the first hook and protected thereby against snagging upon objects when drawn through the water.

2. A construction as defined in claim 1, said body and its front inclined section, at the under side thereof, having an elongated strip permanently secured thereto provided with a transverse bead between its ends, said first hook having a pivotal connection at its forward end with said bead, and said spring means comprising a spring wire of small diameter secured between the rear part of said strip and the under side of said body, and formed with a guide eye at its rear end through which the shank of the first hook passes.

3. In a structure as described, a spoon body of concavo-convex form having a flat extension at its front end inclined upwardly and at a slight angle to the horizontal, said body having at its rear end a downwardly curved, relatively narrow tail-piece with an elongated slot therein, a hook pivotally connected at the under side of said body adjacent its connection with said flat forward extension, said hook extending to the rear and being curved upwardly and thence forwardly and passing through the slot in the tail-piece with its barbed end adapted to lie against the upper side of said body at the forward end of the slot, a light wire of spring material connected at its forward end to the under side of the body adjacent the point of pivotal connection of said hook thereto and extending downwardly and to the rear, said spring wire at its rear end being formed with a downwardly extending eye through which the shank of said hook passes, said eye being located in a plane substantially midway between the ends of the body, said wire being under tension to hold the hook in a lowermost position, and a second hook secured to the spoon body having its rear barbed end portion located beyond the rear end of said tail-piece and at its barbed end extending thereunder into substantial contact engagement with said first hook.

4. In a fish lure, a spoon body of thin metal of concavo-convex form, the concave side of the body being at the under side thereof, said body having at its forward end an upwardly inclined, flat section, a metal strip secured at the under side of said flat section and extending to the forward portion of said body, said strip, adjacent the juncture of the body with said extension, having a transverse, downwardly impressed bead, a wire eye pivotally connected with said bead to turn about an axis transverse to the length of the body, a hook having the end of its shank permanently connected with said eye and extending rearwardly therefrom and curved upwardly and back upon itself, terminating at its rear end at a barb, said spoon body having in its rear end a downwardly and inwardly curved tail-piece with a longitudinal slot therein through which the barbed end of the hook passes, a light spring wire secured between the rear end of said strip and the under side of the spoon body and extending therefrom downwardly and to the rear and terminating in an eye through which the shank of said hook passes, said wire under tension normally holding the hook in a lower position, and a second hook permanently secured to the spoon body and having a rear, downwardly curved, free end portion terminating in a forwardly extending barbed end, said barbed end thereof being in substantial contact engagement with the first hook, the barbed end of the first hook bearing against the upper side of the spoon body and both barbed ends of the hook being thereby protected against snagging.

VICTOR TUSA.

REFERENCES CITED

The following references are of record in the file of this patent:

UNITED STATES PATENTS

| Number | Name | Date |
|---|---|---|
| 378,678 | Harlow | Feb. 28, 1888 |
| 470,312 | Stretch | Mar. 8, 1892 |
| 478,864 | Hunter | July 12, 1892 |
| 2,026,452 | Becker | Dec. 31, 1935 |
| 2,281,809 | Smith | May 5, 1942 |